(12) United States Patent
Kogure (10) Patent No.: US 11,570,373 B2
(45) Date of Patent: Jan. 31, 2023

(54) INFORMATION PROCESSING APPARATUS, IMAGE CAPTURING APPARATUS, METHOD, AND STORAGE MEDIUM

(71) Applicant: CANON KABUSHIKI KAISHA, Tokyo (JP)

(72) Inventor: Kentaro Kogure, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/207,449

(22) Filed: Mar. 19, 2021

(65) Prior Publication Data

US 2021/0306543 A1  Sep. 30, 2021

(30) Foreign Application Priority Data

Mar. 24, 2020  (JP) .............. JP2020-052382

(51) Int. Cl.
*H04N 5/235* (2006.01)
*H04N 5/232* (2006.01)

(52) U.S. Cl.
CPC ......... *H04N 5/2353* (2013.01); *H04N 5/2351* (2013.01); *H04N 5/23219* (2013.01)

(58) Field of Classification Search
CPC . H04N 5/2353; H04N 5/23219; H04N 5/2351
See application file for complete search history.

(56) References Cited

U.S. PATENT DOCUMENTS

| 5,128,769 A | * | 7/1992 | Arai | ................. | H04N 5/235 706/900 |
| 2007/0147701 A1 | * | 6/2007 | Tanaka | ................. | H04N 5/23219 348/E5.038 |
| 2010/0271507 A1 | | 10/2010 | Hung | | |
| 2012/0121129 A1 | * | 5/2012 | Okamoto | ........... | H04N 5/23218 382/103 |
| 2012/0301125 A1 | * | 11/2012 | Ashida | ............. | H04N 5/23219 396/95 |
| 2014/0078372 A1 | * | 3/2014 | Yamashita | ......... | G06V 40/161 348/333.02 |
| 2014/0185875 A1 | * | 7/2014 | Tsuji | ................. | G06V 40/161 382/103 |
| 2017/0366724 A1 | | 12/2017 | Murakita | | |

FOREIGN PATENT DOCUMENTS

| EP | 0409161 A2 | | 1/1991 |
| JP | 2006074144 A | | 3/2006 |
| JP | 2015-130615 A | | 7/2015 |
| JP | 2015130615 A | * | 7/2015 |

OTHER PUBLICATIONS

Machine Translation of JP-2015130615-A (Year: 2015).*

* cited by examiner

*Primary Examiner* — Jason A Flohre
(74) *Attorney, Agent, or Firm* — Canon U.S.A., Inc. IP Division (57) ABSTRACT

There is provided with an information processing apparatus. An obtaining unit obtains an image. A first detecting unit detects a subject from the image. An exposure control unit controls an exposure based on a luminance of the detected subject. A second detecting unit detects a portion of the subject from the exposure-controlled image. A storing unit stores a difference between a first luminance of the detected subject and a second luminance of the portion of the detected subject.

10 Claims, 13 Drawing Sheets

| HUMAN BODY LUMINANCE AT FACE DETECTION | FACE LUMINANCE AT FACE DETECTION | DIFFERENCE BETWEEN FACE LUMINANCE AND HUMAN BODY LUMINANCE AS REFERENCE |
|---|---|---|
| 100 | 130 | +30 |

| FACE ID | FACE IMAGE | FACE FRAME COORDINATES (START POINT x, START POINT y, WIDTH v, HEIGHT h) | HUMAN BODY ID | HUMAN BODY SILHOUETTE | HUMAN BODY FRAME COORDINATES (START POINT x, START POINT y, WIDTH v, HEIGHT h) | HUMAN BODY LUMINANCE AT FACE DETECTION | FACE LUMINANCE AT FACE DETECTION | DIFFERENCE BETWEEN FACE LUMINANCE AND HUMAN BODY LUMINANCE AS REFERENCE |
|---|---|---|---|---|---|---|---|---|
| 001 |  | (300, 700, 200, 200) | 1001 |  | (250, 600, 300, 350) | 100 | 130 | +30 |
| 002 |  | (1200, 400, 190, 210) | 1002 |  | (1150, 300, 290, 360) | 120 | 100 | -20 |

US 11,570,373 B2

INFORMATION PROCESSING APPARATUS, IMAGE CAPTURING APPARATUS, METHOD, AND STORAGE MEDIUM

BACKGROUND OF THE INVENTION

Field of the Invention

The present invention relates to an information processing apparatus, an image capturing apparatus, a method, and a storage medium.

Description of the Related Art

Conventional techniques for exposure compensation based on relationship information about a difference in brightness between a predetermined region of a reference image and the other region of the reference image have been known (refer to, for example, Japanese Patent Laid-Open No. 2006-74144).

SUMMARY OF THE INVENTION

The present invention in its one aspect provides an information processing apparatus comprising a obtaining unit configured to obtain an image, a first detecting unit configured to detect a subject from the image, an exposure control unit configured to control an exposure based on a luminance of the subject detected by the first detecting unit, second detecting unit configured to detect a portion of the subject from the image that is exposure-controlled by the exposure control unit, and storing unit configured to store a difference between a first luminance of the subject detected by the first detecting unit and a second luminance of the portion of the subject that is detected by the second detecting unit, wherein the exposure control unit comprises controlling the exposure based on the second luminance of the portion of the subject when the portion of the subject is detected by the second detecting unit, and controlling the exposure based on a luminance offset based on the first luminance of the subject detected by the first detecting unit and the difference when a state comprises change from a state where the portion of the subject is detected by the first detecting unit to state where the subject is lost.

The present invention in its one aspect provides a method of an information processing apparatus, the method comprising obtaining an image, performing a first detection process to detect a subject from the image, controlling an exposure based on a luminance of the detected subject, performing a second detection process to detect a portion of the subject from the image that is exposure-controlled, and storing a difference between a first luminance of the detected subject and a second luminance of the detected portion of the subject, wherein the controlling comprises controlling the exposure based on the second luminance of the portion of the subject when the portion of the subject is detected, and controlling the exposure based on a luminance offset based on the first luminance of the subject and the difference when a state comprises change from a state where the portion of the subject is detected to a state where the subject is lost.

The present invention in its one aspect provides a computer-readable storage medium storing a program that, when executed by a computer, causes the computer to perform a method comprising obtaining an image, performing a first detection process to detect a subject from the image, controlling an exposure based on a luminance of the detected subject, performing a second detection process to detect a portion of the subject from the image that is exposure-controlled, and storing a difference between a first luminance of the detected subject and a second luminance of the detected portion of the subject, wherein the controlling comprises controlling the exposure based on the second luminance of the portion of the subject when the portion of the subject is detected, and controlling the exposure based on a luminance offset based on the first luminance of the subject and the difference when a state comprises change from a state where the portion of the subject is detected to a state where the subject is lost.

Further features of the present invention will become apparent from the following description of exemplary embodiments with reference to the attached drawings.

DESCRIPTION OF THE EMBODIMENTS

An exemplary embodiment of the present invention improves stability in adjusting an exposure to a specific region of a subject.

Figure 1:
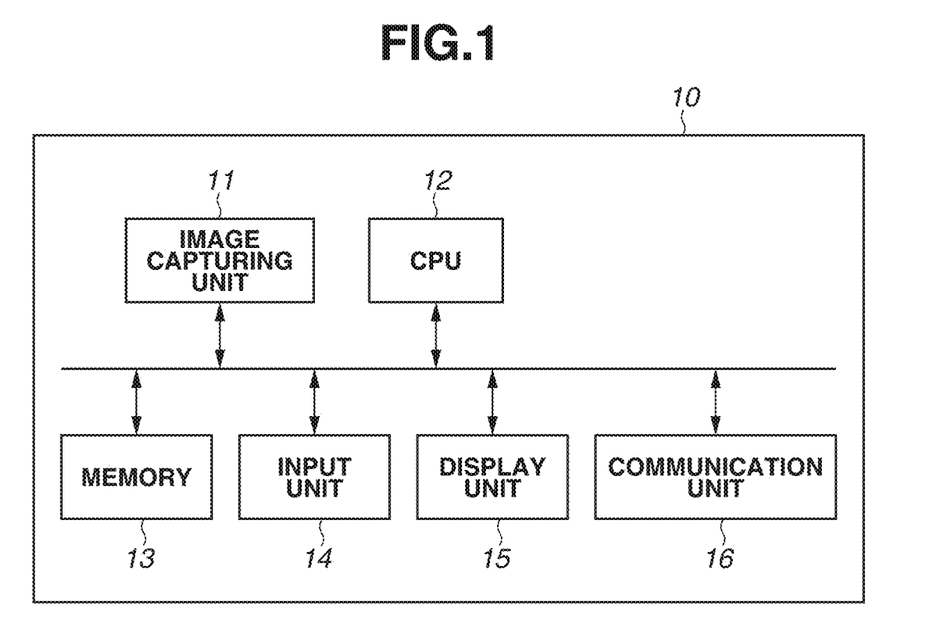
FIG. 1 is a diagram illustrating an example of a hardware configuration of an image capturing apparatus.
Figure 2:
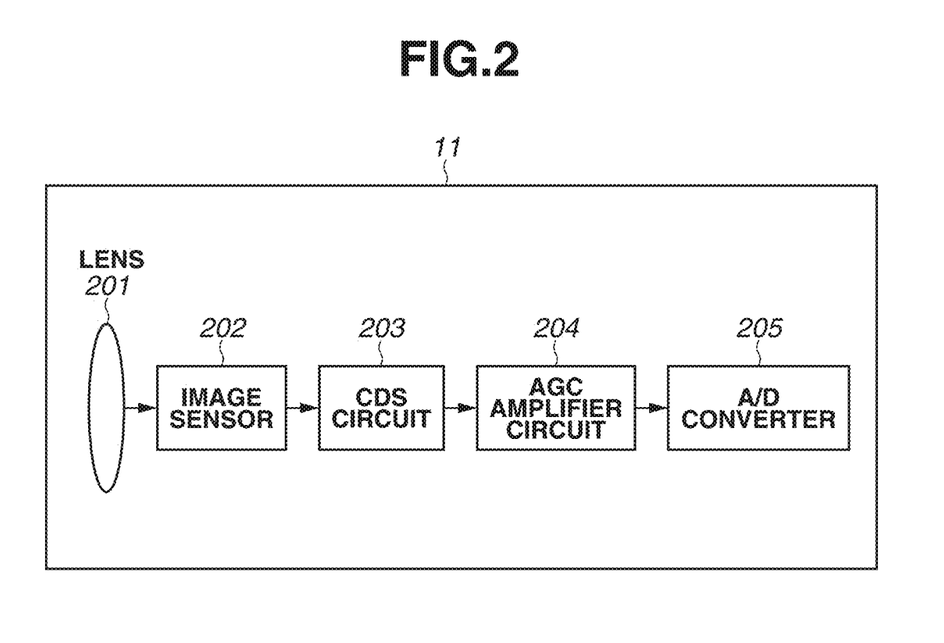
FIG. 2 is a diagram illustrating an example of an image capturing unit.

FIG. 1 is a diagram illustrating an example of a hardware configuration of a camera 10. The camera 10 includes an image capturing unit 11, a central processing unit (CPU) 12, a memory 13, an input unit 14, a display unit 15 and a communication unit 16 as hardware components. The image capturing unit 11 captures subject images. Details of the image capturing unit 11 are illustrated in FIG. 2 described below. The CPU 12 controls the entire camera 10. The memory 13 stores programs, images captured by the image capturing unit 11, and setting values. The input unit 14 inputs user selection operations and transfers the user selection operations to the CPU 12. The display unit 15 displays a screen based on the control of the CPU 12. The communication unit 16 connects the camera 10 to a network and controls communication with other apparatuses.

FIG. 2 is a diagram illustrating an example of the image capturing unit 11. The image capturing unit 11 includes a lens 201 and an image sensor 202. The lens 201 includes several lenses, and the image sensor 202 is a charge-coupled device (CCD) image sensor or a complementary metal oxide semiconductor (CMOS) image sensor. The image capturing unit 11 further includes a correlated double sampling (CDS) circuit 203. The CDS circuit 203 reduces noise. The image capturing unit 11 further includes a gain control amplifier circuit (automatic gain control (AGC) amplifier circuit) 204 that automatically controls the gain of the camera 10. Furthermore, the image capturing unit 11 includes an analog-to-digital (A/D) converter 205. The A/D converter 205 converts analog signals into digital signals.

Figure 3:
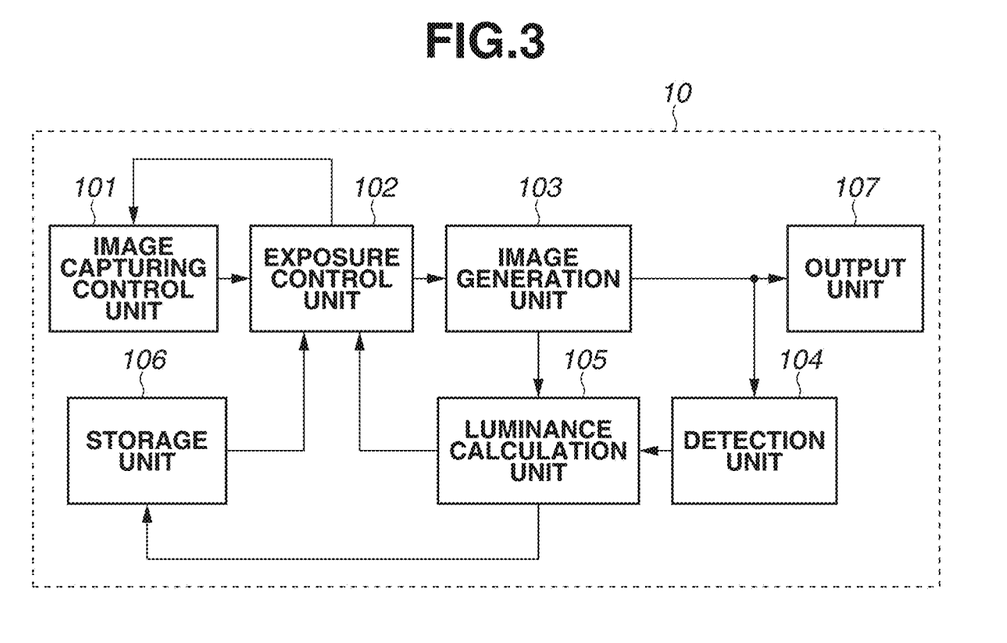
FIG. 3 is a diagram illustrating an example of a software configuration of the image capturing apparatus.

FIG. 3 is a diagram illustrating an example of a software configuration of the camera 10. An image capturing control unit 101 controls the image capturing unit 11. An exposure control unit 102 controls an exposure in image capturing. An image generation unit 103 generates an image captured at an exposure determined by the exposure control unit 102. A detection unit 104 detects a specific object from an image generated by the image generation unit 103. A luminance calculation unit 105 calculates a luminance of a predetermined region of an image generated by the image generation unit 103. A storage unit 106 stores image-related luminance information or specific object-related information. An output unit 107 outputs an image generated by the image generation unit 103 to the outside.

Figure 4:
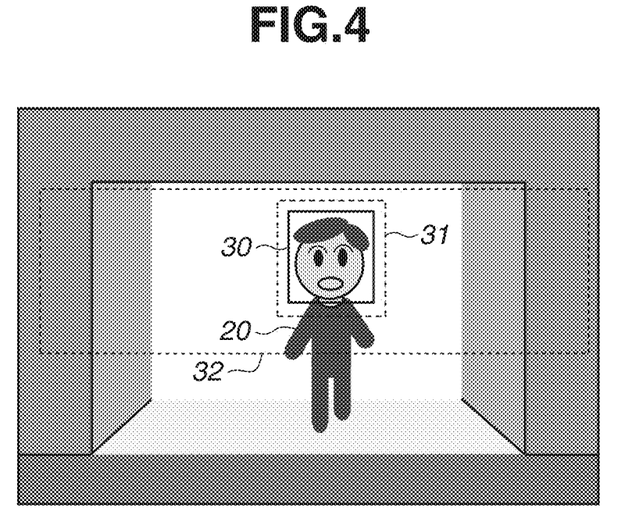
FIG. 4 is a diagram illustrating a case where a person and a face are detected in a captured image.

Next, operations of the above-described components will be described in detail below. First, an image capturing apparatus will be described in detail below with reference to FIGS. 2 and 3. The lens 201 forms a subject image on the image sensor 202 in the subsequent block. Further, the lens 201 can be formed various lenses such as a prime lens and a zoom lens. The image sensor 202 converts the subject image formed via the lens 201 serving as an image capturing optical system into electric signals. Further, an aperture that physically adjusts the amount of light can be provided between the lens 201 and the image sensor 202. The CDS circuit 203 executes a CDS process on the electric signals output from the image sensor 202. The AGC amplifier circuit 204 amplifies the electric signals output from the CDS circuit 203. The A/D converter 205 converts the analog signals amplified by the AGC amplifier circuit 204 into digital signals. The image capturing control unit 101 transfers luminance signals and color signals obtained from the image capturing unit 11 to the exposure control unit 102. The exposure control unit 102 controls the aperture in the lens 201 of the image capturing unit 11, the shutter speed set by the image sensor 202, and the gain controlled by the AGC amplifier circuit 204. Then, exposure control is automatically performed with a target value determined to retain predetermined brightness of a captured image based on a predefined program diagram. The image generation unit 103 generates a captured image captured at an exposure determined by the exposure control unit 102. At this time, various types of general image processing can be performed. Examples of the general image processing include gamma correction, white balance processing, color balance processing, sharpness processing, noise reduction processing, aberration correction, and shading correction. Various image processing parameters of the image generation unit 103 can be changed based on an exposure level set by the exposure control unit 102. For example, a process of increasing the level of noise reduction processing as the gain controlled by the exposure control unit 102 becomes higher is included. The detection unit 104 detects a specific object, such as the face of a person or a human body, from the image on which various types of image processing have been performed by the image generation unit 103 and detects each specific object as a separate object. Further, the type and size of an object to be detected can be predetermined by the detection unit 104 or can be selected by a user as desired. FIG. 4 is a diagram illustrating how a human body and a face are detected from a captured image. In FIG. 4, an object (person) 20 represents a person walking in an entrance of a building from outside of the building, and a solid-line rectangle 30 and a broken-line rectangle 31 respectively represent a face detection frame and a human body detection frame. Further, a dot-line rectangle 32 in FIG. 4 represents a face/human body detectable frame, and only a face or a human body in the frame can be set detectable. Further, the position of the face/human body detectable frame can be fixed or can be designated by a user as desired. Further, setting a face detectable frame and a human body detectable frame separately can be allowed. Since the face/human body detectable frame specified by the dot-line rectangle 32 in FIG. 4 is set, the human body detection frame 31 in FIG. 4 can detect the entire human body, or the shape of a head portion can be detected as a human body. The luminance calculation unit 105 calculates a luminance of a specific object detected by the detection unit 104 and containing a human body or the face of a person at a predetermined timing. The luminance can be calculated by averaging luminances of a predetermined region containing a detected specific object or by weighted-averaging. The predetermined region containing an object can be the entire rectangle frame or can be the entirety or part of the inside of the detected object. In a case where the detection unit 104 detects a specific face and a human body, the luminance of the human body at the time of the face detection, the luminance of the face at the time of the face detection, the luminance of the human body at the time of the human body detection, and the difference between the human body luminance as a reference and the face luminance are calculated for each detected specific face and human body. At this time, the difference between the luminance of the face or human body and the luminance of the entire image is calculated, and in a case where the luminance of the face or human body is relatively lower than the luminance of the entire screen, the scene is determined as a backlight scene (scene determination). The storage unit 106 stores luminance information including the various luminances and the luminance difference that are calculated by the luminance calculation unit 105. The output unit 107 outputs the image on which various types of image processing have been performed by the image generation unit 103. An output destination of the output unit 107 can be a built-in display of the camera 10 or an external terminal apparatus connected via the communication unit 16.

First Embodiment

Figure 5:
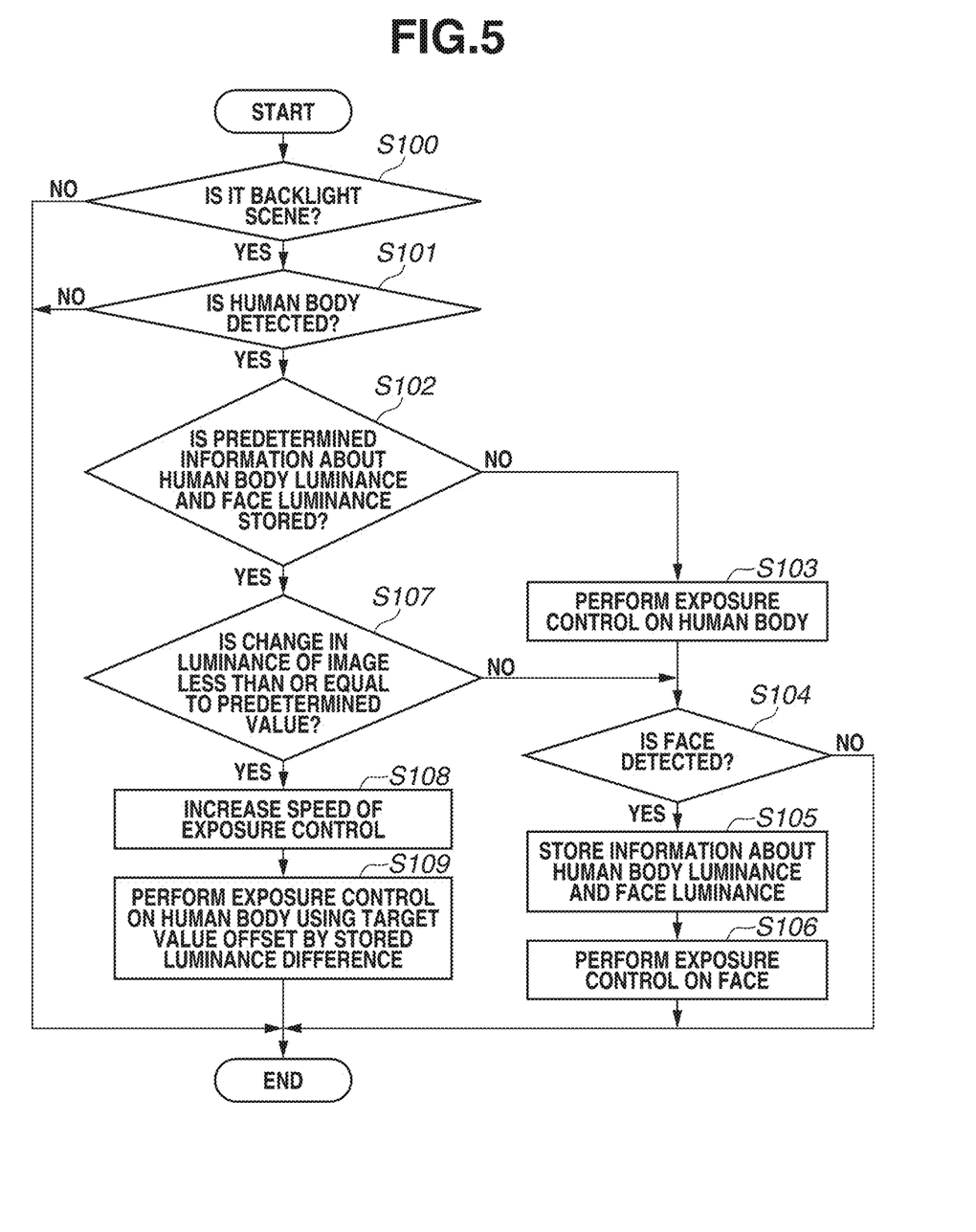
FIG. 5 is a flowchart according to a first exemplary embodiment.

The camera (hereinafter, referred to as "image capturing apparatus") 10 according to the first exemplary embodiment of the present invention will be described below with reference to a flowchart in FIG. 5. In the first exemplary embodiment, FIG. 3 illustrates a configuration of the image capturing apparatus 10. In the present exemplary embodiment, the image capturing control unit 101, the exposure control unit 102, the image generation unit 103, the detection unit 104, the luminance calculation unit 105, the storage unit 106, and the output unit 107 mainly operate to realize a process illustrated in the flowchart in FIG. 5. Further, a subject environment where the image capturing apparatus 10 is performing image capturing is assumed as follows. The person 20 in FIG. 4 is walking into a dark room from the bright outside in a backlight scene where the streams of light are strong during daytime hours.

Figure 6:
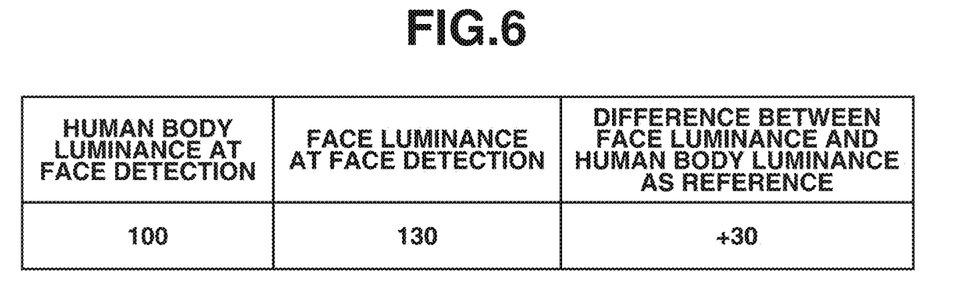
FIG. 6 is a table showing calculation results of luminance information about a person's face and a human body according to the first exemplary embodiment.

First, in step S100, the luminance calculation unit 105 determines whether a captured image generated as a result of processing by the image capturing control unit 101, the exposure control unit 102 and the image generation unit 103 is an image of a backlight scene. The determination regarding whether an image is of a backlight scene can be made by a publicly-known method based on a difference in luminance between a plurality of predetermined regions in the image. Alternatively, a luminance histogram is calculated, and in a case where the proportion of pixels having a luminance higher than or equal to a predetermined value or lower than or equal to a predetermined value is higher than or equal to a predetermined value, the image may be determined as an image of a backlight scene. In a case where the luminance calculation unit 105 determines that the captured image is an image of a backlight scene in step S100 (YES in step S100), then in step S101, the human body detection is performed and it is determined whether there is a human body in the image. In a case where the detection unit 104 detects a human body in step S101 (YES in step S101), then in step S102, it is determined whether predetermined information about human body luminance and face luminance is stored in the storage unit 106. In a case where it is determined that predetermined information about human body luminance and face luminance is not stored in step S102 (NO in step S102), then in step S103, the exposure control unit 102 executes exposure control on the human body. In step S104, it is determined whether a face is detected during the process of adjusting the exposure to the human body in step S103. In a case where the detection unit 104 detects a face in step S104 (YES in step S104), then in step S105, the human body luminance and the face luminance at the time of the face detection are calculated, and the calculated human body luminance and the calculated face luminance are stored in the storage unit 106. FIG. 6 is a table showing calculation results of the human body luminance at the time of the face detection, the face luminance at the time of the face detection, and the difference between the human body luminance as a reference and the face luminance, where the minimum and maximum values of the luminance of the image are respectively set to 0 and 255 with respect to the person 20 in FIG. 4. After the luminance calculation unit 105 stores the various types of calculated luminance information about the human body and face in the storage unit 106 in step S105, the exposure control is executed on the face detected by the detection unit 104 in step S104.

Meanwhile, in a case where the detection unit 104 detects a human body but a detected face is lost, the following process is executed. In a case where it is determined information about human body luminance and face luminance is stored in step S105 (YES in step S102), then in step S107, the luminance calculation unit 105 determines whether a change in luminance of the image is not greater than or equal to a predetermined value. As used herein, a state where a face is lost refers to a state where a detected face becomes partially or entirely undetectable due to an effect of a shielding material or refers to a state where a face detected by the detection unit 104 becomes undetectable due to a change in orientation of the face. A change in the entire image can be determined based on a luminance change in a plurality of predetermined regions in the image or based on a change that is greater than or equal to a predetermined value in a luminance histogram distribution. Further, in a case where both a human body and a face that are detected by the detection unit 104 are lost, the exposure control can be changed to the normal exposure control after a predetermined length of time passes. In the normal exposure control, various general photometry methods, such as average photometry, center-weighted photometry, evaluation photometry, and spot photometry, can be employed with respect to the entire image.

Figure 7:
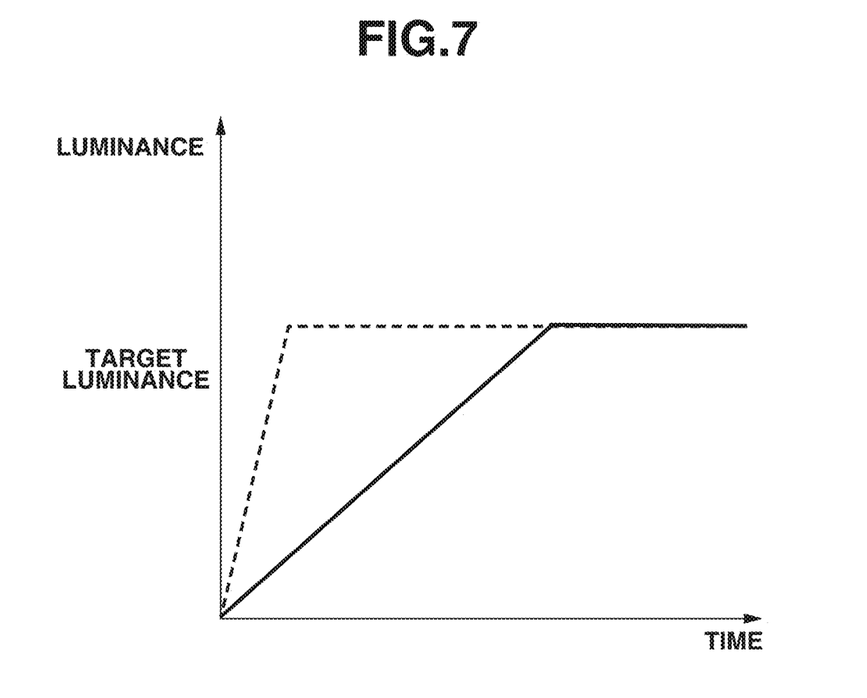
FIG. 7 is a graph showing a difference in exposure control speed controlled by an exposure control unit according to the first exemplary embodiment.
Figure 8:
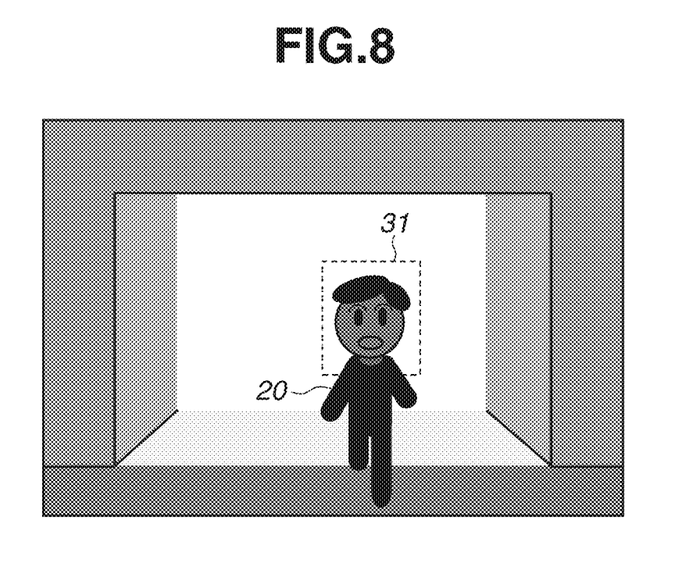
FIG. 8 illustrates an example of a captured image in a case where the position of the person in FIG. 4 is changed and the face is lost according to the first exemplary embodiment.
Figure 9:
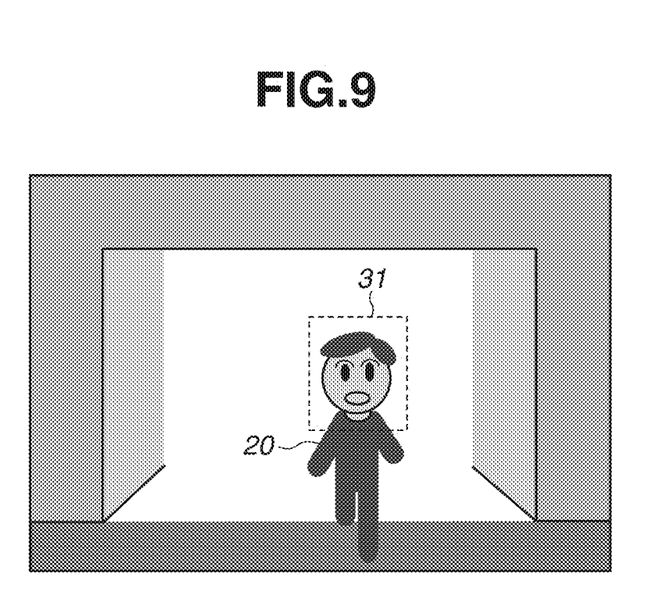
FIG. 9 illustrates an example of a captured image in a case where the position of the person in FIG. 8 is changed and a process illustrated in the flowchart in FIG. 5 is executed according to the first exemplary embodiment.

In a case where it is determined in step S107 that a change in luminance of the image is less than or equal to the predetermined value (YES in step S107), then in step S108, the speed of exposure control executed by the exposure control unit 102 with respect to a predetermined target value is increased. FIG. 7 is a graph illustrating an example of a difference in speed of exposure control by the exposure control unit 102 in step S108. On the graph in FIG. 7, a solid-line represents a case of a normal speed whereas a broken-line represents a case of an increased speed. The graph shows that the time to reach the target luminance is shorter in the exposure control specified by the broken-line. While it is normally desirable to execute exposure control on the face constantly at relatively high speed, increasing the exposure control speed in a state where the target luminance is undefined may result in decreased stability, e.g., the luminance may exceed the target luminance. Further, a means for changing the speed of exposure control executed by the exposure control unit 102 can decrease the resolution of the control of at least one of aperture, gain, and shutter speed per unit time. After the speed of exposure control executed by the exposure control unit 102 is changed in step S108, the exposure control unit 102 obtains the luminance difference between the face luminance and the human body luminance that is stored in the storage unit 106. Then, in step S109, a target value offset by the luminance difference is set for the human body detected by the detection unit 104, and the exposure control is executed. Since the difference between the human body luminance as a reference and the face luminance that is stored in step S105 in FIG. 6 is +30, the target value is constantly offset by +30 with respect to the luminance of the human body detected by the detection unit 104 so that an exposure suitable for the face is maintained even in a state where only the human body is being detected. On the other hand, in step S107, in a case where a change in luminance of the image is greater than or equal to the predetermined value (NO in step S107), the correlation of the luminance difference between the face luminance and the human body luminance that is stored in the storage unit 106 may not be established. Thus, steps S104 to S106 can be executed to store a face luminance and a human body luminance in the storage unit 106 again. Even under an environment where the person 20 in FIG. 8 has walked further inside the room and the face is lost due to underexposure, in a case where steps S107 to S109 are executed, the exposure control corresponding to the target value for the face is executed on the human body compared to the normal exposure control, so that underexposure is prevented as illustrated in FIG. 9. Further, in a case where the person 20 is completely lost and then the human body of the person 20 is detected, the exposure control suitable for the face of the person 20 is executed on the human body of the person 20 at a faster speed than the normal exposure control.

Thus, executing the processes in steps S101 to S109 described above increases the stability of the exposure in a case where a face detected by the detection unit 104 is lost and increases the readiness of the exposure in adjusting the exposure to the same face after the face is lost.

Second Embodiment

Figure 10:
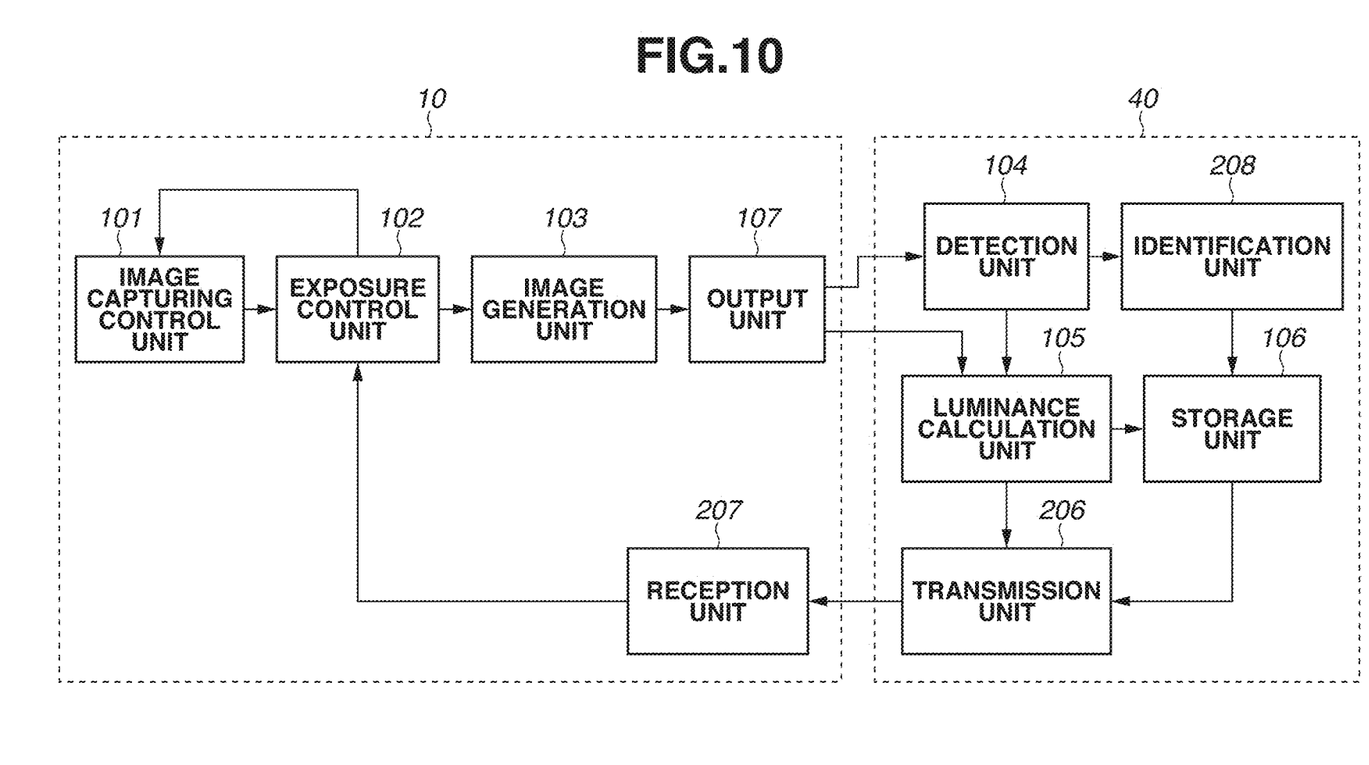
FIG. 10 is a diagram illustrating an example of a configuration of an image capturing system according to a second exemplary embodiment.
Figure 11:
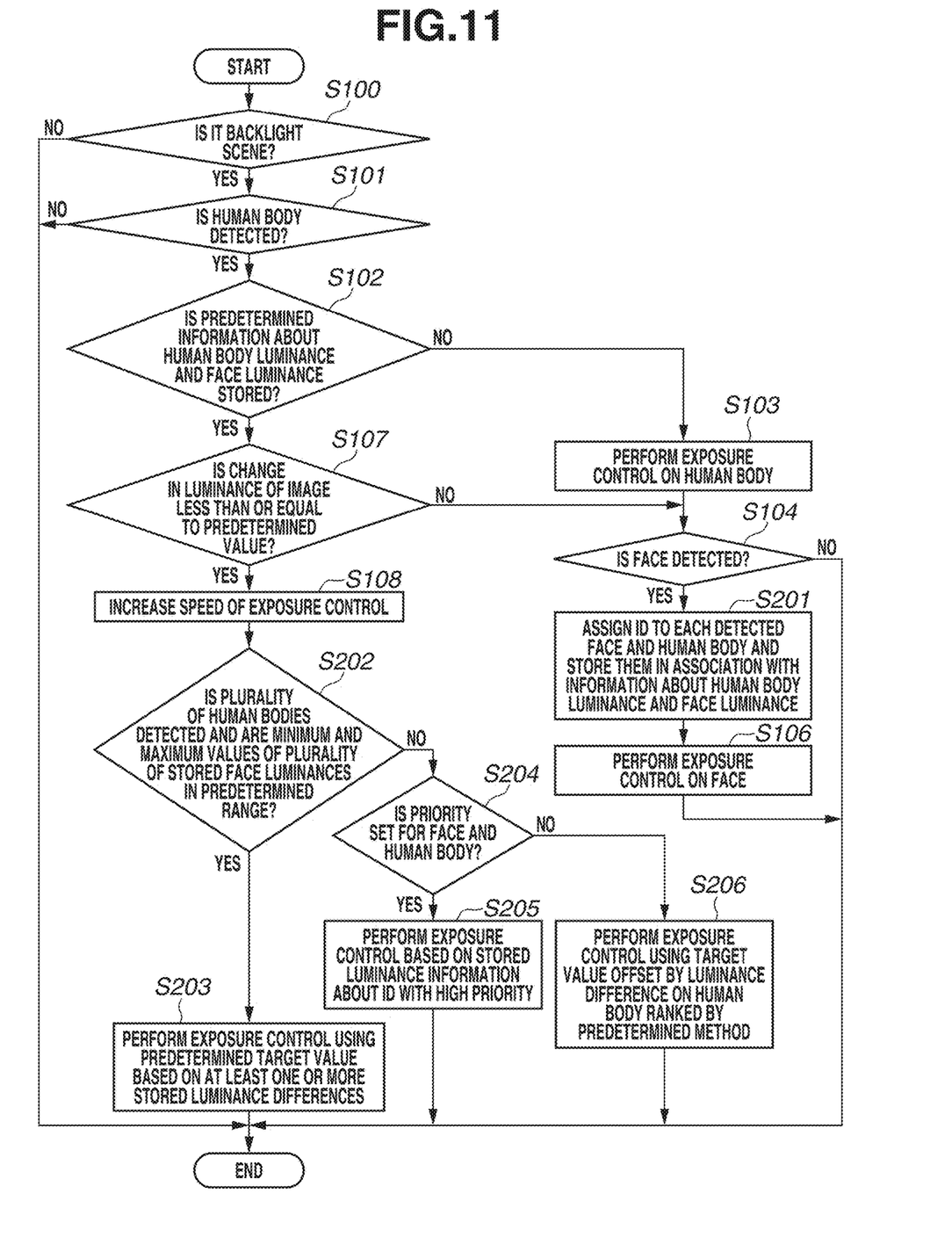
FIG. 11 is a flowchart according to the second exemplary embodiment.
Figure 12:
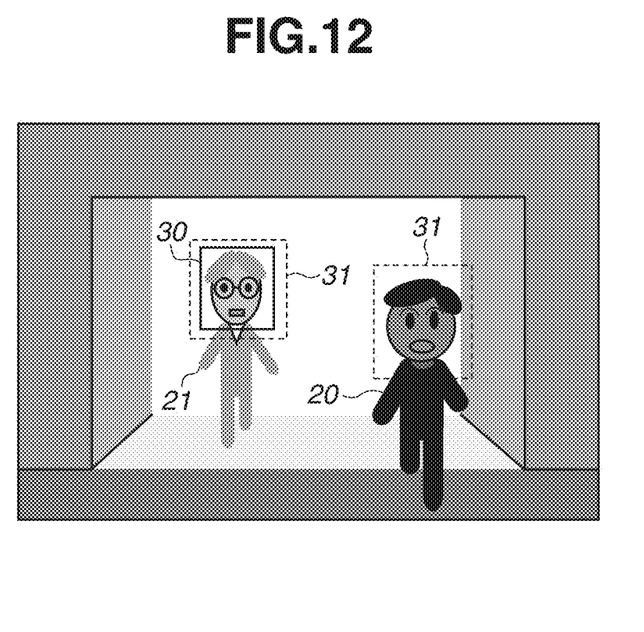
FIG. 12 is a diagram illustrating an example of storing luminance information about a plurality of persons and faces according to the second exemplary embodiment.

An image capturing system according to the second exemplary embodiment of the present invention will be described below with reference to FIG. 10. FIG. 10 is a diagram illustrating a configuration of the image capturing system according to the second exemplary embodiment. In the present exemplary embodiment, the image capturing apparatus 10 and a client apparatus 40 mainly operate to realize a process illustrated in a flowchart in FIG. 11. The processes of the respective components 101 to 107 included in the image capturing apparatus 10 and the client apparatus 40 in FIG. 10 are similar to those described in the first exemplary embodiment, so that redundant descriptions thereof are omitted. A transmission unit 206 of the client apparatus 40 transmits at least an instruction on the exposure control to the image capturing apparatus 10 based on the luminance information obtained from the luminance calculation unit 105 and the storage unit 106. A reception unit 207 of the image capturing apparatus 10 receives the instruction from the client apparatus 40 and transmits the instruction at least to the exposure control unit 102. An identification unit 208 performs feature amount extraction or pattern matching and identifies an individual of a specific object including a face and a human body detected by the detection unit 104. Further, the image capturing apparatus 10 and the client apparatus 40 can communicate using a local network or can communicate via a global network such as the Internet. A subject environment where the image capturing apparatus 10 is performing image capturing is as follows. The person 20 and a person 21 are waking into a dark room from the bright outside in a backlight scene where the streams of light are strong during daytime hours as illustrated in FIG. 12. Further, processes for the solid-line 30 and the broken-lines 31 in FIG. 12 are similar to those in FIG. 4, so that redundant descriptions thereof are omitted.

Figure 13:
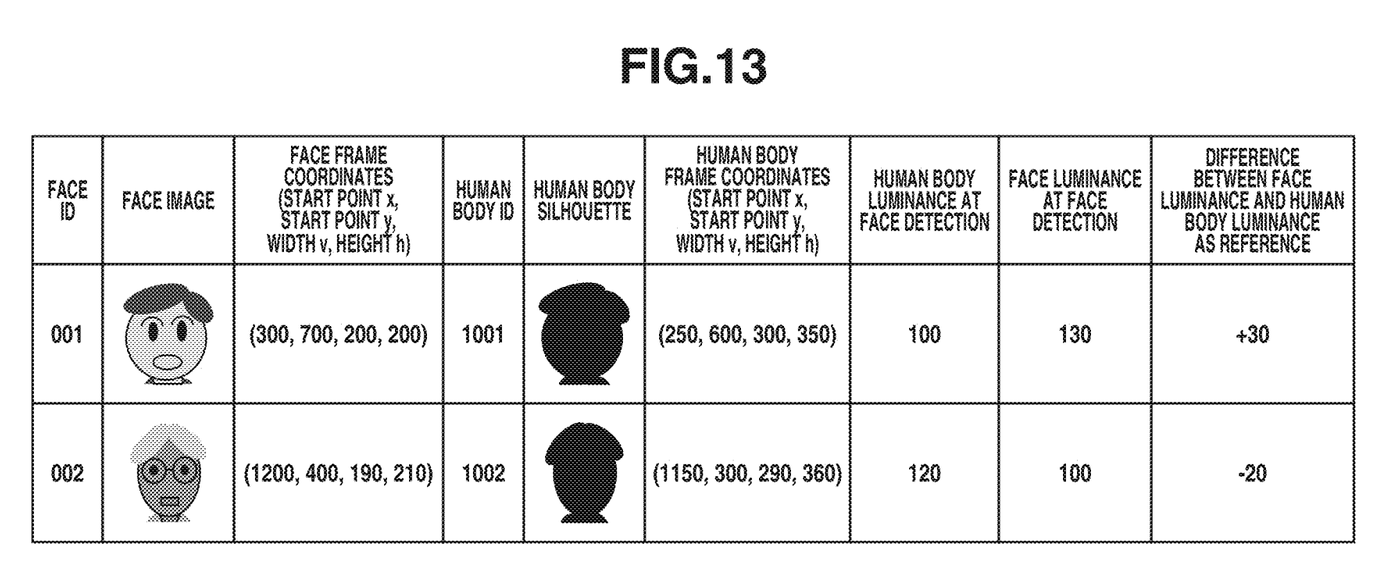
FIG. 13 is a table showing pieces of luminance information about faces and human bodies of a plurality of persons, calculated coordinates, and stored information associated therewith according to the second exemplary embodiment.

Next, the image capturing system according to the second exemplary embodiment of the present invention will be described below with reference to the flowchart in FIG. 11. Steps S100 to S104 and steps S106 to S108 in FIG. 11 are similar to those in the flowchart in FIG. 5 according to the first exemplary embodiment, so that redundant descriptions thereof are omitted. In a case where the processing proceeds to step S104 through steps S100 to S103 and faces are detected in step S104, then in step S201, the identification unit 208 identifies the faces and human bodies and assigns a unique identification (ID) to each of the identified faces and the identified human bodies. Then, the identified faces and human body silhouettes can be stored in association with pieces of information about human body luminance and face luminance in the storage unit 106. At this time, the person 20 in FIG. 12 has the face ID "001" and the human body ID "1001", and the person 21 in FIG. 12 has the face ID "002" and the human body ID "1002". Further, the detection unit 104 or the identification unit 208 can identify and recognize an individual to some extent based on a feature amount of the face image or the silhouette of the human body using a publicly-known technique. Further, two-dimensional coordinates on the image at the time of the human body detection and at the time of the face detection by the detection unit 104 can be stored in association with the detected human body and face in the storage unit 106. FIG. 13 is a table showing the pieces of luminance information about the faces and the human bodies of the persons 20 and 21 in FIG. 12 and the two-dimensional coordinates of the faces and the human bodies at the time of their detection in association with the IDs. For example, the two-dimensional coordinates of the face detection frame and the human body detection frame can be expressed as in the table in FIG. 13. Specifically, the lower left and the upper right of the image are respectively expressed as (x, y)=(0, 0) and (x, y)=(1920, 1080) corresponding to the resolution of the image, and the x- and y-coordinates of a start point of each frame are respectively denoted by x and y, and the width and height of the frame are respectively denoted by v and h. Further, maximum values of x, y, v, and h can each be a value that is sufficiently large not to depend on the resolution. At this time, a feature of each part of the face, skin color, hair color/length, and race that are not shown in the table in FIG. 13 can be estimated from the feature amount of the face image in FIG. 13 and can be associated. Furthermore, in a case where the race or actual skin color can be estimated, the difference between the human body luminance as a reference and the face luminance that is stored in the storage unit 106 can further be offset.

On the other hand, in a state where the processing proceeds through step S108 and pieces of luminance information about a plurality of faces and human bodies are stored, the following process is executed. Specifically, in step S202, it is determined whether there is a plurality of persons detected with a face undetected in a backlight scene and whether the minimum and maximum values of face luminance associated with each of the plurality of human bodies that are stored in the storage unit 106 are within a predetermined range. For example, it can be determined whether the minimum and maximum values are within a face-detectable luminance range. In a case where the minimum and maximum values of the face luminance are within the predetermined range in step S202 (YES in step S202), then in step S203, the exposure control is executed using a target value offset by an average value of the differences between the human body luminances as a reference and the face luminances that are associated with the plurality of human bodies. On the other hand, in a case where the minimum and maximum values are outside the predetermined range in step S202 (NO in step S202), then in step S204, it is determined whether a priority is set for the human bodies detected by the detection unit 104 and the faces associated with the human bodies. At this time, the luminance range can be adjusted based on statistical data on the face luminances detected by the detection unit 104 and the race and skin color information identified by the identification unit 208. In a case where a priority is set in step S204 (YES in step S204), then in step S205, the exposure control is executed using a target value offset by the difference in luminance between the human body with a high priority and the face associated with the human body. On the other hand, in a case where a priority is not sett in step S204 (NO in step S204), then in step S206, the human bodies detected by the detection unit 104 are ranked by a predetermined ranking method, and the exposure control is executed using a target value offset by the difference in luminance between the human body with a high rank and the face associated with the human body. In the predetermined ranking, the detection order of the detected faces or human bodies, whether the two-dimensional coordinates are near a specific region, the distance from the image center, or whether the size is large can be taken into consideration in ranking the human bodies.

By executing steps S201 to S206 described above, the exposure control can be executed with the face luminance taken into consideration as appropriate even in a case where a plurality of persons is detected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-052382, filed Mar. 24, 2020, which is hereby incorporated by reference herein in its entirety.

What is claimed is:

1. An information processing apparatus comprising:
at least one processor; and
a memory coupled to the at least one processor, the memory storing instructions that, when executed by the processor, cause the processor to:
obtain an image;
detect a subject from the obtained image;
calculate a luminance of the subject in the obtained image;
control an exposure based on the luminance of the subject;
detect a portion of the subject from the exposure-controlled image;
calculate a luminance of the subject in the exposure-controlled image;
calculate a luminance of the portion of the subject in the exposure-controlled image;
store, in a case where the portion of the subject is detected, a luminance difference between the calculated luminance of the subject in the exposure-controlled image and the calculated luminance of the portion of the subject in the exposure-controlled image;
determine whether the luminance difference is stored when the subject is detected;
determine, in a case where the luminance difference is stored, whether a change in luminance of the obtained image is less than or equal to a predetermined value;
correct the luminance of the subject, in a case where a change in luminance of the obtained image is less than or equal to the predetermined value, based on the luminance difference; and
control exposure based on the corrected luminance of the subject by the luminance difference.

2. The information processing apparatus according to claim 1, wherein the instructions further cause the at least one processor to:
determine a scene,
wherein in a case where the scene is a backlight scene, the exposure is controlled based on the corrected luminance based on the luminance difference.

3. The information processing apparatus according to claim 1, wherein the instructions further cause the at least one processor to:
changes a speed of the exposure control based on the luminance difference.

4. The information processing apparatus according to claim 3, wherein the greater the speed of the exposure is the greater the luminance difference is.

5. The information processing apparatus according to claim 1, wherein in a case where a plurality of subjects is detected, a priority is changed based on a detection order or size of each of the detected subjects.

6. The information processing apparatus according to claim 1, wherein the instructions further cause the at least one processor to:
detects a human body as the subject; and
detect a face as the portion of the subject.

7. The information processing apparatus according to claim 6, wherein the instructions further cause the at least one processor to:
identify a race, a skin color, or a feature of each part from the face detected by the second detecting unit; and
changes a range of the luminance to be corrected based on statistical data obtained from pieces of information about identified a plurality of faces.

8. An image capturing apparatus comprising the information processing apparatus according to claim 1.

9. A method comprising:
obtaining an image;
detecting a subject from the obtained image;
calculating a luminance of the subject in the obtained image;
controlling an exposure based on the luminance of the subject;
detecting a portion of the subject from the exposure-controlled image;
calculating a luminance of the subject in the exposure-controlled image;
calculating a luminance of the portion of the subject in the exposure-controlled image;
storing, in a case where the portion of the subject is detected, a luminance difference between the calculated luminance of the subject in the exposure-controlled image and the calculated luminance of the portion of the subject in the exposure-controlled image;

determine whether the luminance difference is stored when the subject is detected;

determine, in a case where the luminance difference is stored, whether a change in luminance of the obtained image is less than or equal to a predetermined value;

correcting the luminance of the subject, in a case where the change in luminance of the obtained image is less than or equal to the predetermined value, based on the luminance difference; and controlling exposure based on the corrected luminance of the subject by the luminance difference.

10. A non-transitory computer-readable medium storing a program for causing a computer to perform a method comprising:

obtaining an image;

detecting a subject from the obtained image;

calculating a luminance of the subject in the obtained image;

controlling an exposure based on the luminance of the subject;

detecting a portion of the subject from the exposure-controlled image;

calculating a luminance of the subject in the exposure-controlled image;

calculating a luminance of the portion of the subject in the exposure-controlled image;

storing, in a case where the portion of the subject is detected, a luminance difference between the calculated luminance of the subject in the exposure-controlled image and the calculated luminance of the portion of the subject in the exposure-controlled image;

determine whether the luminance difference is stored when the subject is detected;

determine, in a case where the luminance difference is stored, whether a change in luminance of the obtained image is less than or equal to a predetermined value;

correcting the luminance of the subject, in a case where the change in luminance of the obtained image is less than or equal to the predetermined value, based on the luminance difference; and controlling exposure based on the corrected luminance of the subject by the luminance difference.

* * * * *